(12) United States Patent
Kang et al.

(10) Patent No.: US 9,701,862 B2
(45) Date of Patent: Jul. 11, 2017

(54) METHOD OF PREPARING HARD COATING FILM

(71) Applicant: LG CHEM, LTD., Seoul (KR)

(72) Inventors: Joon Koo Kang, Daejeon (KR); Yeong Rae Chang, Daejeon (KR); Sung Don Hong, Daejeon (KR); Soon Hwa Jung, Daejeon (KR); Eun Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/404,184

(22) PCT Filed: May 31, 2013

(86) PCT No.: PCT/KR2013/004805
§ 371 (c)(1),
(2) Date: Nov. 26, 2014

(87) PCT Pub. No.: WO2013/180510
PCT Pub. Date: Dec. 5, 2013

(65) Prior Publication Data
US 2015/0175808 A1 Jun. 25, 2015

(30) Foreign Application Priority Data

| May 31, 2012 | (KR) | 10-2012-0058634 |
| May 31, 2012 | (KR) | 10-2012-0058635 |
| May 31, 2012 | (KR) | 10-2012-0058636 |
| May 31, 2012 | (KR) | 10-2012-0058637 |
| May 30, 2013 | (KR) | 10-2013-0062098 |

(51) Int. Cl.
| C09D 4/00 | (2006.01) |
| C08K 3/36 | (2006.01) |
| B05D 3/06 | (2006.01) |
| C09D 135/02 | (2006.01) |
| C09D 133/04 | (2006.01) |
| G02B 1/10 | (2015.01) |
| C08K 5/3475 | (2006.01) |
| C09D 7/12 | (2006.01) |
| C09D 105/16 | (2006.01) |
| C09D 133/14 | (2006.01) |
| C09D 167/00 | (2006.01) |
(Continued)

(52) U.S. Cl.
CPC ........... *C09D 135/02* (2013.01); *B05D 3/067* (2013.01); *C08J 5/18* (2013.01); *C08J 7/04* (2013.01); *C08J 7/042* (2013.01); *C08J 7/047* (2013.01); *C08K 5/3475* (2013.01); *C09D 4/00* (2013.01); *C09D 7/1216* (2013.01); *C09D 7/1241* (2013.01); *C09D 105/16* (2013.01); *C09D 133/04* (2013.01); *C09D 133/14* (2013.01); *C09D 167/00* (2013.01); *G02B 1/10* (2013.01); *G02B 1/105* (2013.01); *C08J 2301/12* (2013.01); *C08J 2367/02* (2013.01); *C08J 2433/14* (2013.01); *C08J 2435/02* (2013.01); *C08K 3/36* (2013.01); *C08K 2003/2227* (2013.01); *C08K 2003/2241* (2013.01); *C08K 2003/2296* (2013.01); *C08K 2201/005* (2013.01); *C08K 2201/011* (2013.01); *Y10T 428/2495* (2015.01); *Y10T 428/259* (2015.01); *Y10T 428/269* (2015.01); *Y10T 428/31507* (2015.04); *Y10T 428/31797* (2015.04); *Y10T 428/31884* (2015.04); *Y10T 428/31928* (2015.04)

(58) Field of Classification Search
CPC ... B05D 3/067; C08J 7/18; C09D 4/00; C09D 7/1216; C09D 7/1241; C09D 133/14; C08K 3/36; C08K 5/3475; G02B 1/14
See application file for complete search history.

(56) References Cited

U.S. PATENT DOCUMENTS

| 4,902,578 A | 2/1990 | Kerr, III |
| 6,245,833 B1 | 6/2001 | Kang et al. |
(Continued)

FOREIGN PATENT DOCUMENTS

| CN | 1558824 A | 12/2004 |
| CN | 1611968 A | 5/2005 |
(Continued)

OTHER PUBLICATIONS

Search Report issued in International Application No. PCT/KR2013/004809 dated Aug. 12, 2013, 5 pages.
(Continued)

*Primary Examiner* — Dah-Wei D Yuan
*Assistant Examiner* — Kristen A Dagenais
(74) *Attorney, Agent, or Firm* — Rothwell, Figg, Ernst & Manbeck, P.C.

(57) ABSTRACT

A method of preparing a hard coating film by applying a hard coating composition onto both sides of a supporting substrate, thereby forming a hard coating layer on each side of the supporting substrate, the hard coating composition comprising a binder including a tri- to hexa-functional acrylate-based monomer, inorganic particles and a photoinitiator; and irradiating the applied hard coating layers with ultraviolet to simultaneously photocure the hard coating layers, wherein the hard coating film has a pencil hardness of 7H or more under a load of 1 kg, and properties such that when the hard coating film is exposed to a temperature of 50 to 90° C. and a humidity of 80 to 90% for 70 to 100 hours and then placed on a plane, the maximum distance at which each edge of the hard coating film is spaced apart from the plane is 1.0 mm or less.

19 Claims, No Drawings

(51) Int. Cl.
   *C08J 7/04*  (2006.01)
   *C08J 5/18*  (2006.01)
   *C08K 3/22*  (2006.01)

(56) References Cited

U.S. PATENT DOCUMENTS

| | | |
|---|---|---|
| 6,489,015 B1 | 12/2002 | Tsuchiya et al. |
| 7,622,055 B2 * | 11/2009 | Nakano .............. G02B 5/3033 252/299.01 |
| 2003/0008162 A1 | 1/2003 | Oya et al. |
| 2004/0081831 A1 | 4/2004 | Shoshi et al. |
| 2004/0135159 A1 | 7/2004 | Siegel |
| 2005/0136252 A1 | 6/2005 | Chisholm et al. |
| 2005/0136273 A1 | 6/2005 | Hashimoto et al. |
| 2006/0134400 A1 | 6/2006 | Takada et al. |
| 2006/0234035 A1 | 10/2006 | Wang et al. |
| 2006/0286383 A1 | 12/2006 | Gilmer |
| 2007/0178297 A1 | 8/2007 | Takada et al. |
| 2007/0231566 A1 * | 10/2007 | Yoneyama ............ G02B 1/105 428/331 |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0218666 A1 | 9/2008 | Toyooka |
| 2008/0257216 A1 | 10/2008 | Ravyst |
| 2008/0311351 A1 | 12/2008 | Hsu et al. |
| 2009/0169896 A1 | 7/2009 | Sohn et al. |
| 2009/0214871 A1 * | 8/2009 | Fukuda .................. C09D 4/00 428/413 |
| 2009/0301561 A1 | 12/2009 | Wang et al. |
| 2010/0084037 A1 | 4/2010 | Ericsson et al. |
| 2010/0124631 A1 | 5/2010 | Horio et al. |
| 2010/0124656 A1 | 5/2010 | Horio et al. |
| 2010/0167068 A1 | 7/2010 | Horio |
| 2011/0050623 A1 | 3/2011 | Lee et al. |
| 2011/0124823 A1 | 5/2011 | Hayashi et al. |
| 2012/0019766 A1 | 1/2012 | Oki et al. |
| 2012/0034450 A1 * | 2/2012 | Morita ..................... C08J 7/047 428/331 |
| 2012/0128890 A1 | 5/2012 | Mirchev |
| 2014/0079937 A1 | 3/2014 | Jung et al. |
| 2015/0299507 A1 | 10/2015 | Kang et al. |

FOREIGN PATENT DOCUMENTS

| | | |
|---|---|---|
| CN | 1286640 C | 11/2006 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-145965 A | 6/2007 |
| JP | 2007-262281 A | 10/2007 |
| JP | 2007-313872 A | 12/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-505452 A | 2/2011 |
| JP | 2011-046917 A | 3/2011 |
| JP | 2011-075705 A | 4/2011 |
| JP | 2011-093290 A | 5/2011 |
| JP | 2011-126160 A | 6/2011 |
| JP | 2011-126164 A | 6/2011 |
| JP | 2011-126165 A | 6/2011 |
| JP | 2011-145593 A | 7/2011 |
| JP | 2011-148181 A | 8/2011 |
| JP | 2011-148301 A | 8/2011 |
| JP | 2011-523370 A | 8/2011 |
| JP | 2011148181 A * | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2011-246548 A | 12/2011 |
| JP | 2012-027190 A | 2/2012 |
| JP | 2012-027401 A | 2/2012 |
| JP | 2012-051118 A | 3/2012 |
| JP | 2012-063577 A | 3/2012 |
| JP | 2012-066477 A | 4/2012 |
| JP | 2012-072235 A | 4/2012 |
| JP | 4911474 B2 | 4/2012 |
| JP | 2012-518713 A | 8/2012 |
| JP | 2012-206262 A | 10/2012 |
| JP | 2013-095108 A | 5/2013 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-2002-0008267 A | 1/2002 |
| KR | 10-0867338 B1 | 9/2002 |
| KR | 10-2004-0037081 A | 5/2004 |
| KR | 10-25004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |

(56) References Cited

FOREIGN PATENT DOCUMENTS

| | | |
|---|---|---|
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0061821 A | 6/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |
| KR | 10-2010-0026012 A | 3/2010 |
| KR | 10-2010-0026014 A | 3/2010 |
| KR | 10-2010-0037519 A | 4/2010 |
| KR | 10-2010-0041992 A | 4/2010 |
| KR | 10-2010-0045997 A | 5/2010 |
| KR | 10-2010-0055160 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2010-0132786 A | 12/2010 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-0002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |
| WO | 2007-121102 A1 | 10/2007 |
| WO | WO 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2012-026475 A1 | 3/2012 |
| WO | 2012/060145 A1 | 5/2012 |
| WO | 2012-066743 A1 | 5/2012 |
| WO | 2013/105656 A1 | 7/2013 |

OTHER PUBLICATIONS

Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Shin-Nakamura Chemical Co., Ltd.; (2009); Product list; Retrieved from http://www.shin-nakamura.com/products/monomer-oligomer-07.html (2 pages).
Ciba TINUVIN 900 Light Stabilizer, Ciba Specialty Chemicals, 1997, pp. 1-3.

* cited by examiner

US 9,701,862 B2

METHOD OF PREPARING HARD COATING FILM

CROSS REFERENCE TO RELATED APPLICATIONS

This application is a 35 U.S.C. §371 National Phase Entry Application from PCT/KR2013/004805, filed May 31, 2013, and designating the United States, which claims priority under 35 U.S.C. §119 to Korean Patent Application No. 10-2012-0058634, filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, and to Korean Patent Application No. 10-2013-0062098, filed on May 30, 2013, which are incorporated herein by reference in their entireties.

TECHNICAL FIELD

The present invention relates to a method of preparing a hard coating film. More particularly, the present invention relates to a method of preparing a hard coating film having high hardness.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, and 10-2013-0062098, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, a film with high hardness and wear resistance is required. In this regard, it is proposed to have a structure in which the substrate is coated with a hard coating layer.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3H, which is not sufficient to alternate glass panels for displays.

DISCLOSURE

Technical Problem

Accordingly, the present invention has been devised to solve the above-mentioned problems, and an object of the present invention is to provide a method of preparing a hard coating film having high hardness, which is not easily curled, warped or cracked.

Technical Solution

In order to accomplish the above object, an aspect of the present invention provides a method of preparing a hard coating film, including the steps of: applying a hard coating composition onto both sides of a supporting substrate, the hard coating composition including a binder containing a tri- to hexa-functional acrylate-based monomer, inorganic particles and a photoinitiator; and irradiating the applied hard coating composition with ultraviolet to simultaneously photocure the hard coating composition, thus forming a hard coating layer.

Advantageous Effects

As described above, the method according to the present invention makes it possible to easily prepare a hard coating film of high hardness, with a reduced occurrence of curls.

The hard coating film prepared by the method exhibits excellent properties in terms of hardness, scratch resistance, and transparency. In addition, it is of high workability and thus is much less prone to curling and cracking. Therefore, this hard coating film can be usefully applied to front panels or display panels of mobile appliances, display devices, instruments and the like.

BEST MODE FOR CARRYING OUT THE INVENTION

In accordance with an aspect thereof, the present invention provides a method of preparing a hard coating film, including the steps of: applying a hard coating composition onto both sides of a supporting substrate, the hard coating composition including a binder containing a tri- to hexa-functional acrylate-based monomer, inorganic particles and a photoinitiator; and irradiating the applied hard coating composition with ultraviolet to simultaneously photocure the hard coating composition, thus forming a hard coating layer.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail.

In the method of preparing a hard coating film according to an embodiment of the present invention, first, a hard coating composition including a binder containing a tri- to hexa-functional acrylate-based monomer, inorganic particles and a photoinitiator is applied onto both sides of a supporting substrate.

In the method of the present invention, so long as it is transparent, any plastic resin, whether capable of being stretched or not, may be used for the supporting substrate which will be coated at both sides with the hard coating composition, without limitations imposed thereto. According to an embodiment of the present invention, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may include a copolymer of polymethylmethacrylate (PMMA) and polycarbonate (PC).

The thickness of the supporting substrate may be, but is not limited to, about 30 to about 1,200 µm, or about 50 to about 800 µm.

The hard coating composition, which is applied onto both sides of the supporting substrate, includes a binder containing a tri- to hexa-functional acrylate-based monomer, inorganic particles and a photoinitiator.

In the present specification, the term "acrylate-based" is intended to encompass acrylate, methacrylate, and derivatives thereof with various substituents.

The binder includes a tri- to hexa-functional acrylate-based monomer.

Examples of the tri- to hexa-functional acrylate-based monomer may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexa-functional acrylate-based monomers may be used independently or in a combination thereof.

According to an embodiment of the present invention, the binder may further include a mono- to di-functional acrylate-based monomer.

Examples of the mono- to di-functional acrylate-based monomer may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. These mono- to di-functional acrylate-based monomers may also be used independently or in a combination thereof.

According to an embodiment of the present invention, the binder may be included in an amount of about 35 to about 85 parts by weight or about 45 to about 80 parts by weight, based on 100 parts by weight of the hard coating composition. When the amount of the binder in the hard coating composition is present in the above range, a hard coating film, which exhibits high hardness and which is not easily curled or cracked due to its excellent workability, can be formed.

Further, in the hard coating composition, when the binder further includes mono- to di-functional acrylate-based monomers, the content ratio of mono- to di-functional acrylate-based monomers to tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to an embodiment of the present invention, the binder may further include a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200%, or about 20 to about 150%, as measured according to ASTM D638.

When the hard coating composition of the present invention further includes a photocurable elastic polymer, the photocurable elastic polymer is crosslink-polymerized with the tri- to hexa-functional acrylate-based monomers and then cured to form a hard coating layer, which is improved in flexibility and impact resistance.

When the binder further includes a photocurable elastic polymer, the content ratio of the photocurable elastic polymer to the tri- to hexa-functional acrylate-based monomer is not particularly limited. However, according to an embodiment of the present invention, the photocurable elastic polymer and the tri- to hexa-functional acrylate-based monomer may be included such that the weight ratio thereof may be about 5:95 to about 20:80. When the photocurable elastic polymer and the tri- to hexa-functional acrylate-based monomer are included at the above weight ratio, the hard coating layer may be imparted with high hardness and flexibility without deteriorating other physical properties such as curl characteristics, light resistance and the like, and, particularly, it is possible to prevent the hard coating layer from being damaged by external impact, thus assuring excellent impact resistance.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds to have excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

Since the polyrotaxane has excellent scratch resistance, it can exhibit self-recovery ability when it is externally damaged and scratched.

In the method of the present invention, the hard coating composition includes inorganic particles.

According to an embodiment of the present invention, as the inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the inorganic particles.

The inorganic particles included in the hard coating composition make an additional contribution to improving the hardness of the hard coating film.

According to an embodiment of the present invention, the inorganic particles may be included in an amount of about 10 to about 60 parts by weight or about 20 to about 50 parts by weight, based on 100 parts by weight of the hard coating composition. When the amount of the inorganic particles is present in the above range, the effect of improving the hardness of a hard coating film by the addition of inorganic particles without deteriorating the physical properties of the hard coating composition can be accomplished.

In the method of the present invention, the hard coating composition includes a photoinitiator.

According to an embodiment of the present invention, examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxyl)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators may be used independently or in a mixture thereof.

According to an embodiment of the present invention, the photoinitiator may be included in an amount of about 0.5 to about 10 parts by weight or about 1 to about 5 parts by weight, based on 100 parts by weight of the hard coating composition. When the amount of the photoinitiator is present in the above range, sufficient crosslink-photopolymerization can be accomplished without deteriorating the physical properties of a hard coating film.

Meanwhile, in the method of preparing a hard coating film according to the present invention, the hard coating composition may further include commonly-used additives such as a surfactant, a yellowing inhibitor, a leveling agent, an antifouling agent and the like in addition to the above-mentioned components. Here, the content of the additive is not particularly limited because the content thereof may be variously adjusted while not deteriorating the physical properties of the hard coating composition.

According to an embodiment of the present invention, for example, the hard coating composition may include a surfactant as an additive. The surfactant may be a mono- to di-functional fluorine-based acrylate, a fluorine-based surfactant or a silicon-based surfactant. Further, the hard coating composition may include a yellowing inhibitor as an additive. The yellowing inhibitor may be a benzophenone compound or a benzotriazole compound.

Further, in the method of the present invention, the hard coating composition may be used in a solvent-free form, but may further include an organic solvent selectively in order to adjust the viscosity and fluidity of the hard coating composition at the time of coating the supporting substrate with this composition and to improve the coatability of this composition to the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the method of the present invention, when the organic solvent is additionally included in the hard coating composition, the organic solvent may be added such that the weight ratio of hard coating composition: organic solvent is about 70:30 to about 99:1. As such, when the hard coating composition has a high solid content, the viscosity of the hard coating composition increases, and thus thick coating can be performed, thereby forming a thick hard coating layer having a thickness of 50 µm or more.

According to an embodiment of the present invention, the viscosity of the hard coating composition is not particularly limited as long as it has suitable fluidity and coatability, but the hard coating composition can exhibit high viscosity because it has a relatively high solid content. For example, the hard coating composition of the present invention may have a viscosity of about 100 to about 1,200 cps, about 150 to about 1,200 cps, or about 300 to about 1,200 cps at 25° C.

The hard coating composition including the above-mentioned components is applied onto both sides of the supporting substrate. According to an embodiment of the present invention, the hard coating composition may be sequentially applied onto the front and back sides of the supporting substrate, or may be simultaneously applied onto both sides of the supporting substrate.

In this case, the method of applying the hard coating composition is not particularly limited as long as it can be used in the related field. For example, the hard coating composition may be applied by bar coating, knife coating, roll coating, blade coating, die coating, micro-gravure coating, comma coating, slot die coating, lip coating, solution casting or the like.

Further, the hard coating composition may be applied onto both sides of the supporting substrate such that a hard coating layer formed by curing the applied hard coating composition has a thickness of about 50 to about 300 µm, about 50 to about 150 µm, or about 70 to about 100 µm. According to the method of preparing a hard coating film of the present invention, even when the hard coating layer is formed to the above thickness, a hard coating film having high hardness can be prepared without the formation of curls or cracks.

After the hard coating composition is applied, the procedure of stabilizing the surface of the applied hard coating composition may be selectively performed. This procedure may be performed by heat-treating the supporting substrate coated with the hard coating composition at predetermined temperature. Thus, the surface of the applied hard coating composition is flattened, and volatile components included in the hard coating composition are volatilized, thus stabilizing the surface thereof.

Next, the hard coating composition applied on the supporting substrate is irradiated with ultraviolet to simultaneously photocure the hard coating composition on both sides of the supporting substrate, thus forming a hard coating layer.

In the present specification, the description "simultaneously photocure the hard coating composition" means that the hard coating compositions applied on both sides of the supporting substrate are photocured such that the curing rates thereof are similar to or equal to each other, and includes the meaning that, when the time taken from the start of curing of the hard coating composition applied on one side of the supporting substrate to the end of curing thereof is indicated by 100%, the hard coating composition applied on the other side of the supporting substrate is cured while the time difference between the hard coating compositions applied onto both sides of the supporting substrate is maintained at 20% or less.

Generally, an acrylate-based binder monomer may cause a curing shrinkage phenomenon or curl phenomenon in which a supporting substrate is rolled up together with a coating layer due to shrinkage attributable to curing. The curl phenomenon is a phenomenon in which the edge or the like of a planar film is curvilinearly warped or rolled up when the planar film is spread on a flat plate, and this curl phenomenon occurs when an acrylate-based binder monomer is contracted in the procedure of photocuring this acrylate-based binder monomer by ultraviolet irradiation.

Particularly, in order to use a hard coating film in covers for mobile terminals such as smart phones or covers for tablet PCs, it is important that the hardness of a hard coating film is improved to such a degree that the hard coating film replaces glass. In this case, in order to improve the hardness of the hard coating film, basically, the thickness of a hard coating layer must be increased to a predetermined thickness, for example, 50 µm or more, 70 µm or more, or 100 µm or more. However, as the thickness of the hard coating layer is increased, the curl phenomenon caused by curing shrinkage is also increased, so the adhesion of the hard coating layer to the supporting substrate is decreased, and the hard coating film is easily rolled up. For this reason, a process of flattening the supporting substrate may be additionally performed, but this process is problematic in that the hard coating layer is cracked. Therefore, it is not easy to prepare a hard coating film having high hardness that can replace glass without deteriorating the physical properties thereof.

According to the method of preparing a hard coating film of the present invention, when the hard coating compositions applied on both sides of the supporting substrate are irradiated with ultraviolet to allow the applied hard coating compositions to be simultaneously photocured, it is possible to prevent the applied hard coating compositions from being rolled up, thus preparing a hard coating film exhibiting excellent physical and optical properties without forming curls or cracks.

For example, the irradiation rate of ultraviolet may be about 20 to about 600 mJ/cm$^2$ or about 50 to about 500 mJ/cm$^2$. The light source for ultraviolet irradiation is not particularly limited as long as it can be used in the related field. For example, as the light source of ultraviolet irradiation, a high-pressure mercury lamp, a metal halide lamp, a black light lamp, a fluorescent lamp or the like may be used. When the applied hard coating composition is irradiated with ultraviolet at the above irradiation rate for about 30 seconds to about 15 minutes or for about 1 to about 10 minutes, this hard coating composition may be photocured.

According to an embodiment of the present invention, the thickness ratio of the supporting substrate to the hard coating layer formed on one side of the supporting substrate may be about 1:0.5 to about 1:2 or about 1:0.5 to about 1:1.5. When the thickness ratio thereof is present in the above range, a hard coating film, which exhibits high hardness and which is not easily curled or cracked, can be formed.

The hard coating film obtained by the method of the present invention can be usefully used in various fields because it exhibits high hardness, scratch resistance, transparency, durability, light resistance, light transmittance and the like.

For example, the hard coating film obtained by the method of the present invention may have a pencil hardness of 7H or more, 8H or more or 9H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film obtained by the method of the present invention may have a light transmittance of 91.0% or more or 92.0% or more and a haze of 1.0% or less, 0.5% or less or 0.4% or less.

Further, when the hard coating film obtained by the method of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less or about 0.3 mm or less.

Further, the hard coating film obtained by the method of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film prepared by the method of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Preparation Example 1: Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether and 315 g of methyl ethyl ketone. Then, the mixture was reacted at 70° C. for 5 hours to obtain polyrotaxane in which polylactone with an acrylate moiety conjugated to the end thereof acted as the macrocycle while cyclodextrin was positioned as the stopper.

The weight average molecular weight of the obtained polyrotaxane was 600,000 g/mol, and the elongation thereof was 20%, as measured according to ASTM D638.

Example 1

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a hard coating composition.

The hard coating composition was applied onto both sides of a PET supporting substrate having a size of 15 cm×20 cm and a thickness of 188 μm by bar coating. Then, the supporting substrate coated on both sides thereof with the hard coating composition was passed between ultraviolet (UV) irradiators, each of which was mounted with a metal halide lamp emitting a wavelength of 290~320 nm and which were provided both over and under the supporting substrate, to photocure the hard coating composition, thereby forming hard coating layers on both sides of the supporting substrate.

The thickness of each of the hard coating layers formed on both sides of the supporting substrate is 100 μm.

Example 2

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were dissolved in 2 g of methyl ethyl ketone (MEK) to prepare a hard coating composition.

The hard coating composition was applied onto both sides of a PC/PMMA coextruded supporting substrate having a size of 15 cm×20 cm and a thickness of 180 μm. Thereafter, a hard coating film was prepared in the same manner as in Example 1.

Example 3

A hard coating film was prepared in the same manner as in Example 1, except that 8 g of a silica-dipentaerythritolhexacrylate (DPHA) composite (silica 2.4 g, DPHA 5.6 g) dispersed with silica nanoparticles having a particle size of 20~30 nm in an amount of 30 wt % was used as a monomer for a binder.

Example 4

9 g of a silica-dipentaerythritolhexacrylate (DPHA) composite (silica 3.6 g, DPHA 5.4 g) dispersed with silica nanoparticles having a particle size of 20~30 nm in an amount of 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a hard coating composition.

Thereafter, a hard coating film was prepared in the same manner as in Example 1.

Example 5

A hard coating film was prepared in the same manner as in Example 4, except that 1 g of a urethane acrylate-based polymer (brand name: UA200PA, Shinnakamura Chemicals Corp., weight average molecular weight: 2,600 g/mol, elongation measured based on ASTM D638: 170%) was used instead of 1 g of polyrotaxane of Preparation Example 1.

Example 6

A hard coating film was prepared in the same manner as in Example 4, except that 1 g of a urethane acrylate-based polymer (brand name: UA340P, Shinnakamura Chemicals Corp., weight average molecular weight: 13,000 g/mol, elongation measured based on ASTM D638: 150%) was used instead of 1 g of polyrotaxane of Preparation Example 1.

The components and contents of the hard coating compositions of Examples 1 to 6 are summarized in Table 1 below.

TABLE 1

| | Monomers for binder | | Photocurable | | |
|---|---|---|---|---|---|
| No. | 3-6 functional acrylate | 1-2 functional acrylate | elastic polymer (unit: g) | Inorganic particles (unit: g) | Supporting substrate |
| Ex. 1 | DPHA 4.8 g | HEA 2 g | 0 | 3.2 | PET |
| Ex. 2 | DPHA 4.8 g | HEA 2 g | 0 | 3.2 | PC/PMMA |
| Ex. 3 | DPHA 5.6 g | 0 | 0 | 2.4 | PET |
| Ex. 4 | DPHA 5.4 g | 0 | 1 | 3.6 | PET |
| Ex. 5 | DPHA 5.4 g | 0 | 1 | 3.6 | PET |
| Ex. 6 | DPHA 5.4 g | 0 | 1 | 3.6 | PET |

TEST EXAMPLE

Measuring Method

1) Pencil Hardness

Pencil hardness was evaluated according to the Japanese Standard JIS K5400. In this regard, a pencil hardness meter was reciprocated three times on each of the hard coating film under a load of 1.0 kg to determine the hardness at which no scratches were observed.

2) Scratch Resistance

After being loaded to a friction tester, a steel wool (#0000) was reciprocated 400 times on each of the hard coating films under a load of 0.5 kg, and scratches thus formed were counted. Evaluation was made of the scratch resistance of the films by marking O for two or less scratches, Δ for two to less than five scratches, and x for five or more scratches.

3) Light Resistance

Differences in color b* value of the hard coating films were measured before and after exposure to UVB from UV lamp for 72 hours.

4) Transmittance and Haze

The transmittance and haze of the hard coating films were measured using a spectrophotometer (brand name: COH-400).

5) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

6) Cylindrical Bending Test

Each of the hard coating films was wound on a cylindrical mandrel having a diameter of 3 cm, and then it was determined whether or not each of the hard coating film was cracked. IF each of the hard coating films was not cracked, it was evaluated as OK, and if it was cracked, it was evaluated as X.

7) Impact Resistance

The impact resistance of each of the hard coating films was evaluated by determining whether or not each of the hard coating films was cracked when a 22 g steel ball was dropped thereon from a height of 40 cm. When each of the hard coating films was not cracked, it is indicated by OK, and when it was cracked, it is indicated by X.

The results of the physical properties measured in the hard coating films are summarized in Table 2 below.

TABLE 2

| | Ex. 1 | Ex. 2 | Ex. 3 | Ex. 4 | Ex. 5 | Ex. 6 |
|---|---|---|---|---|---|---|
| Pencil hardness | 8H | 8H | 9H | 9H | 9H | 8H |
| Scratch resistance | O | O | O | O | O | O |
| Light resistance | 0.20 | 0.20 | 0.24 | 0.20 | 0.25 | 0.21 |
| Transmittance | 92.2 | 92.5 | 92.4 | 92.0 | 92.3 | 91.8 |
| Haze | 0.4 | 0.2 | 0.4 | 0.3 | 0.2 | 0.3 |
| Bending test | OK | OK | OK | OK | OK | OK |
| Curl property | 0.0 mm | 0.0 mm | 0.0 mm | 0.0 mm | 0.0 mm | 0.0 mm |
| Impact resistance | OK | OK | OK | OK | OK | OK |

As given in Table 2 above, it can be ascertained that all of the hard coating films obtained by the methods of Examples 1 to 6 exhibit good physical properties.

The invention claimed is:

1. A method of preparing a hard coating film, comprising the steps of:
    applying a hard coating composition onto both sides of a supporting substrate, thereby forming a hard coating layer on each side of the supporting substrate, the hard coating composition comprising a binder including a tri- to hexa-functional acrylate-based monomer, inorganic particles and a photoinitiator; and
    irradiating the applied hard coating layers with ultraviolet to simultaneously photocure the hard coating layers,
    wherein the hard coating film has a pencil hardness of 7H or more under a load of 1 kg, and properties that when the hard coating film is exposed to a temperature of 50 to 90° C. and a humidity of 80 to 90% for 70 to 100 hours and then placed on a plane, the maximum distance at which each edge of the hard coating film is spaced apart from the plane is 1.0 mm or less.

2. The method of claim 1, wherein the tri- to hexa-functional acrylate-based monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

3. The method of claim 1, wherein the binder further includes a mono- to di-functional acrylate-based monomer.

4. The method of claim 3, wherein the mono- to difunctional acrylate-based monomer includes at least one selected from the group consisting of hydroxyethyl acrylate (HEA), hydroxyethyl methacrylate (HEMA), hexanediol diacrylate (HDDA), tripropyleneglycol diacrylate (TPGDA), and ethyleneglycol diacrylate (EGDA).

5. The method of claim 1, wherein the binder further includes a photocurable elastic polymer.

6. The method of claim 5, wherein the photocurable elastic polymer has an elongation of 15 to 200%, as measured according to ASTM D638.

7. The method of claim 5, wherein the photocurable elastic polymer includes at least one selected from the group consisting of polycaprolactone, a urethane acrylate-based polymer, and polyrotaxane.

8. The method of claim 7, wherein the polyrotaxane includes: a macrocycle in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

9. The method of claim 1, wherein the supporting substrate includes at least one selected from the group consisting of polyethyleneterephthalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), and triacetylcellulose (TAC).

10. The method of claim 1, wherein the hard coating composition is applied by bar coating, knife coating, roll coating, blade coating, die coating, micro-gravure coating, comma coating, slot die coating, lip coating or solution casting.

11. The method of claim 1, wherein the hard coating composition is applied onto both sides of the supporting substrate at the same time.

12. The method of claim 1, wherein the inorganic particles have a particle size of 100 nm or less.

13. The method of claim 1, wherein the inorganic particles includes at least one selected from the group consisting of silica nanoparticles, aluminum oxide nanoparticles, titanium oxide nanoparticles and zinc oxide nanoparticles.

14. The method of claim 1, wherein the hard coating composition includes 35 to 85 parts by weight of the binder, 10 to 60 parts by weight of the inorganic particles and 0.5 to 10 parts by weight of the photoinitiator, based on 100 parts by weight of the hard coating composition.

15. The method of claim 1, wherein the hard coating composition further includes an additive.

16. The method of claim 15, wherein the additive includes a yellowing inhibitor containing a benzophenone compound or a benzotriazole compound.

17. The method of claim 1, wherein the hard coating composition further includes an organic solvent.

18. The method of claim 1, wherein the hard coating layer has a thickness of 50 to 300 μm.

19. The method of claim 1, wherein a thickness ratio of the supporting substrate to the hard coating layer is 1:0.5 to 1:2.

* * * * *